US008122866B2

(12) United States Patent
Fonville et al.

(10) Patent No.: US 8,122,866 B2

(45) Date of Patent: Feb. 28, 2012

(54) ACOUSTIC BUMPERS WITH ENGINE FRONT COVER HIDDEN MOUNTING

(75) Inventors: Carl E. Fonville, Ann Arbor, MI (US); Michael R. Thelen, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 695 days.

(21) Appl. No.: 12/260,109

(22) Filed: Oct. 29, 2008

(65) Prior Publication Data

US 2010/0101528 A1 Apr. 29, 2010

(51) Int. Cl.
*F02B 77/00* (2006.01)
*F02B 77/13* (2006.01)
*B60G 11/22* (2006.01)

(52) U.S. Cl. ..................... 123/195 C; 181/204; 267/293

(58) Field of Classification Search .............. 123/195 C, 123/198 E; 181/204; 267/292–294
See application file for complete search history.

(56) References Cited

U.S. PATENT DOCUMENTS

| | | | | |
|---|---|---|---|---|
| 546,831 | A * | 9/1895 | Spencer | 267/293 |
| 3,052,435 | A * | 9/1962 | Roller | 248/569 |
| 3,997,151 | A * | 12/1976 | Leingang | 267/294 |

* cited by examiner

*Primary Examiner* — Noah Kamen
(74) *Attorney, Agent, or Firm* — Quinn Law Group, PLLC

(57) ABSTRACT

The present invention provides novel acoustic bumpers that can dampen vibrations and control noise transmission from an engine front cover, or other component. In one embodiment, the front cover carries a water pump and internal water distribution passages and covers an overhead camshaft drive mechanism and an oil pump mounted on the engine block. Noise control of unsupported cover central portions is provided by acoustic bumpers carried on inside cover bosses and engaging surfaces in accessible locations on the engine block front face or on associated components. The acoustic bumpers may be doughnut shaped annular rings having identical coaxial locating recesses on opposite sides for error-free installation. A central web between the recesses includes an axially located retainer hole. Each bumper may be mounted on a pillar on the inside cover face that includes a fastener receiving blind hole centrally located on a raised circular boss.

16 Claims, 4 Drawing Sheets

ACOUSTIC BUMPERS WITH ENGINE FRONT COVER HIDDEN MOUNTING

TECHNICAL FIELD

This invention relates to acoustic bumpers and to reduction of radiated noise from an internal combustion engine cover, such as a front cover, the acoustic bumpers being mounted on hidden rear surfaces of the cover.

BACKGROUND OF THE INVENTION

It is known in the art to provide various means for reducing auditory noise radiated from operating internal combustion engines such as automotive vehicle engines. In the design of a new engine, various components and covers mounted to the exterior of an engine block and crankcase are evaluated for noise radiation at audible frequencies. Where possible, noise may be reduced by connecting a component or cover more securely to the engine block so they act more like a solid body. However, the application of additional bolts may be prevented by internal components under the cover and may result in alignment or leak problems if applied. Another solution may be to increase the stiffness of a cover to increase its stiffness and change the radiated noise frequencies. However, this generally increases mass and unnecessary mass is not desired as it may adversely affect fuel economy. Suitable alternative means for reducing radiated noise from a cover or component are desired.

SUMMARY OF THE INVENTION

The present invention provides novel acoustic bumpers that control noise transmission from an engine front cover, or other component, which may be formed as a single metal casting mounted on the engine block. In one embodiment, the cover carries a water pump and internal water distribution passages and covers an overhead camshaft drive mechanism and an oil pump mounted on the engine block. Because of the cam drive and the water pump with passages, noise control of the cover central portions is provided by acoustic bumpers carried on inside cover bosses and engaging surfaces in accessible locations on the engine block front face or on associated components.

The acoustic bumpers may be doughnut shaped annular rings having identical coaxial locating recesses on opposite sides for error-free installation. A central web between the recesses includes an axially located retainer hole. Each bumper may be mounted on a pillar or boss on the inside cover face that includes a fastener receiving blind hole centrally located on a raised circular locator to position the bumper on the boss. Any suitable fastener may be used, but a headed push pin retainer is preferred for ease of assembly and retention. The pillars are of selected height suitable for engagement of the bumper with a mating engine block or component surface at each location.

The bumpers are installed on the cover prior to installation of the cover on the engine block and may be installed by a supplier and shipped to the assembly site ready for cover installation. When the cover is installed, the bumpers engage the selected locations on the block or associated mechanism and exert a noise damping force on the cover to reduce transmission of noise vibrations from the cover exterior to the external surroundings.

The resilient bumpers are usable in locations where bolting or internal ribbing is not possible or is undesirable due to added weight, lack of clearance or possible leak problems.

When installed, the bumpers are not visible, need no maintenance and are prevented from detaching by compression of the bumpers and the cover locators at each location.

These and other features and advantages of the invention will be more fully understood from the following description of certain specific embodiments of the invention taken together with the accompanying drawings.

DESCRIPTION OF AN EXEMPLARY EMBODIMENT

Figure 1:
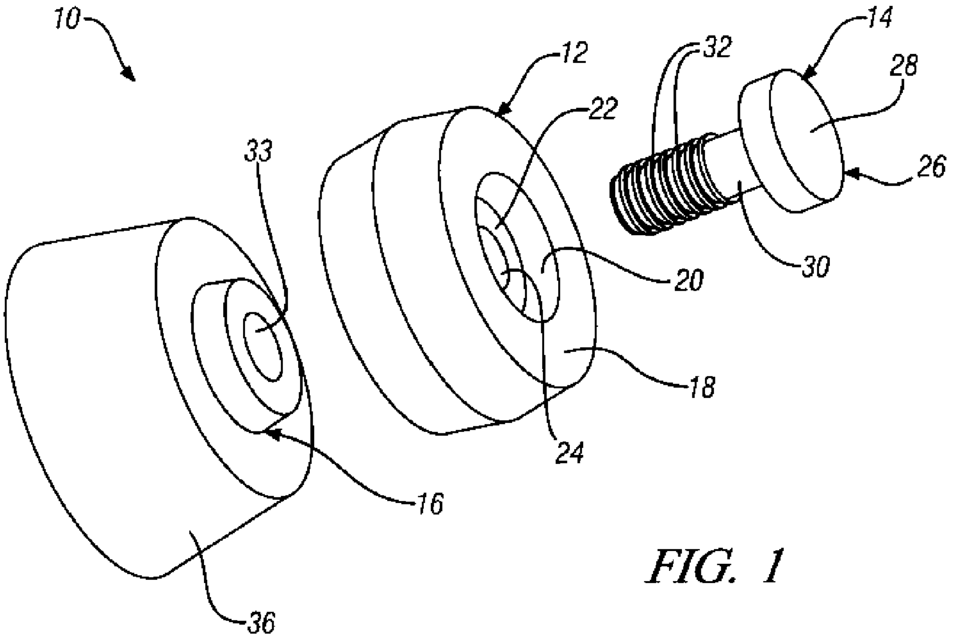
FIG. 1 is an exploded view of a resilient acoustic bumper and fastener assembly attached to a mounting boss of an engine front cover.

Referring first to FIG. 1 of the drawings in detail, numeral 10 generally indicates an assembly of an acoustic bumper 12 and retainer 14 attached to a boss 16 which may be on the inside of an engine front cover for damping noise vibrations of the cover in accordance with the invention.

Bumper 12 may be formed of any suitable resilient oil and temperature resistant elastomer material capable of maintaining resilient compression qualities in a hot engine oil lubricated environment within an engine cover. The acoustic bumper 12 is configured as an annular ring 18 (generally doughnut shaped) having identical coaxial locating recesses 20 on opposite sides of the ring 18 so that the bumper 12 may be installed with either side facing inward to avoid assembly errors. The recesses are separated by a central web 22 including an axially located through retainer hole 24. The sides of the annular ring 18 and the locating recesses 20 may be sloped to accommodate withdrawal from a forming die or to improve ease of installation.

The retainer 14 may be of any suitable form, such as a headed screw if desired, but it may be a manual push pin 26 having a head 28 and a shank 30 including withdrawal deterring means, such as deformable ridges 32 around the shank for holding the shank in an opening 33, such as a blind hole, after manual installation.

The cover boss 16 may include only a raised annular portion 34 of the cover configured to be received in either of the locating recesses 20 of the acoustic bumper 12 for maintaining the bumper in installed position on the boss. However a height extending pillar 36 may be added to position the height of the bumper to engage an associated engine block or component with a desired degree of compression. The retainer hole 33 may be a blind hole sized to receive the retainer shank 30 and hold the retainer in place until the bumper is installed in compression in an assembly, for example, where the bumper 12 is maintained in position by the raised portion 34 and the retainer 14 is no longer needed for retention, unless disassembled.

Figure 3:
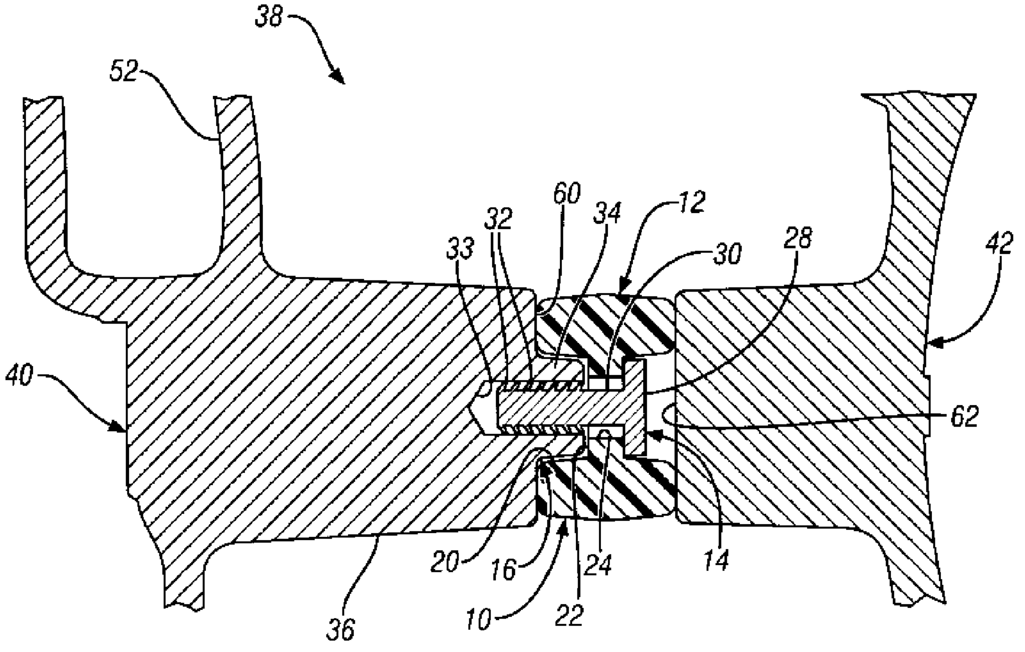
FIG. 3 is a cross-sectional view from the line 3-3 of FIG. 2 showing noise damping engagement of an acoustic bumper on the front cover with an associated engine block.
Figure 2:
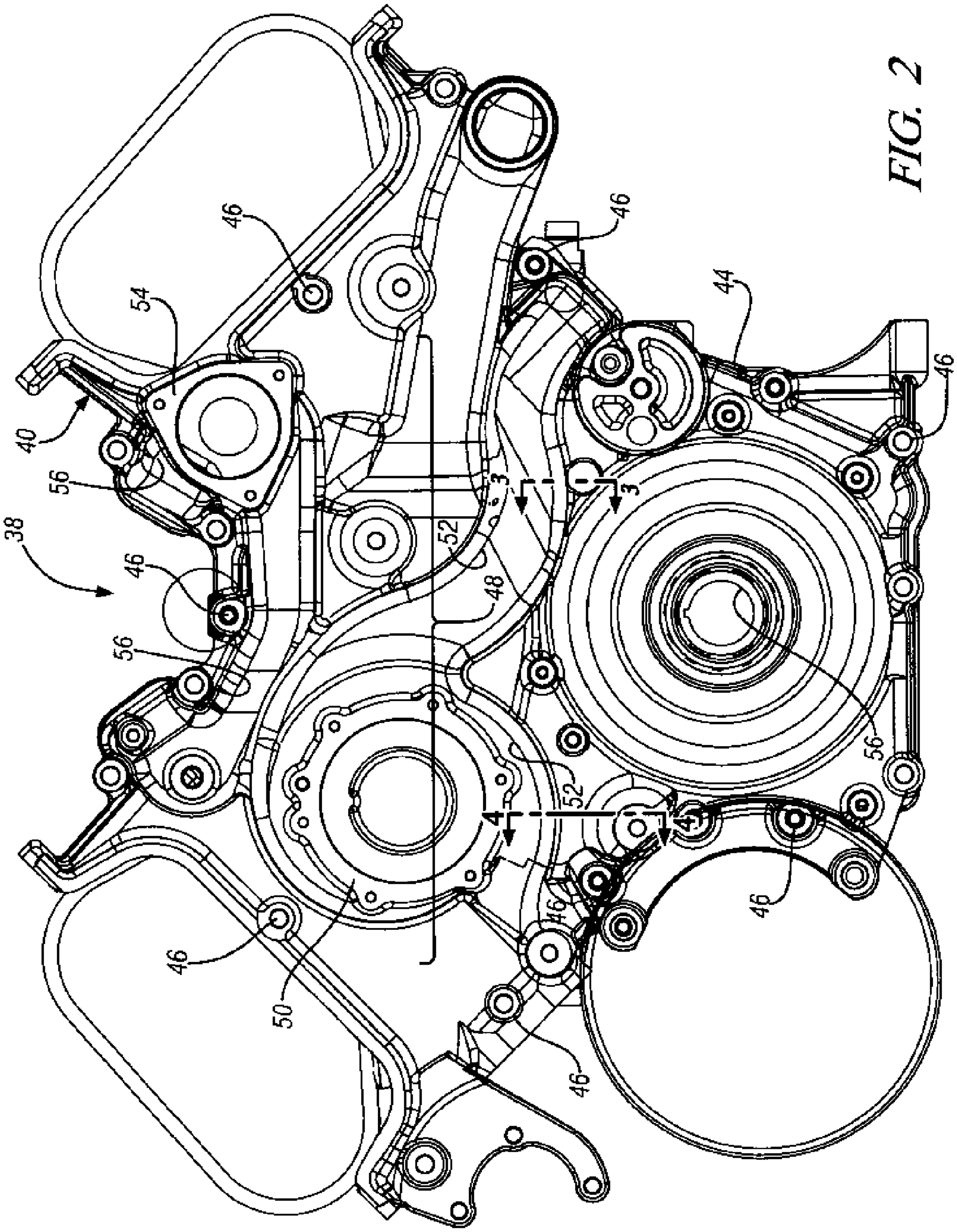
FIG. 2 is a front view of an engine front cover having rear mounted acoustic bumpers.
Figure 4:
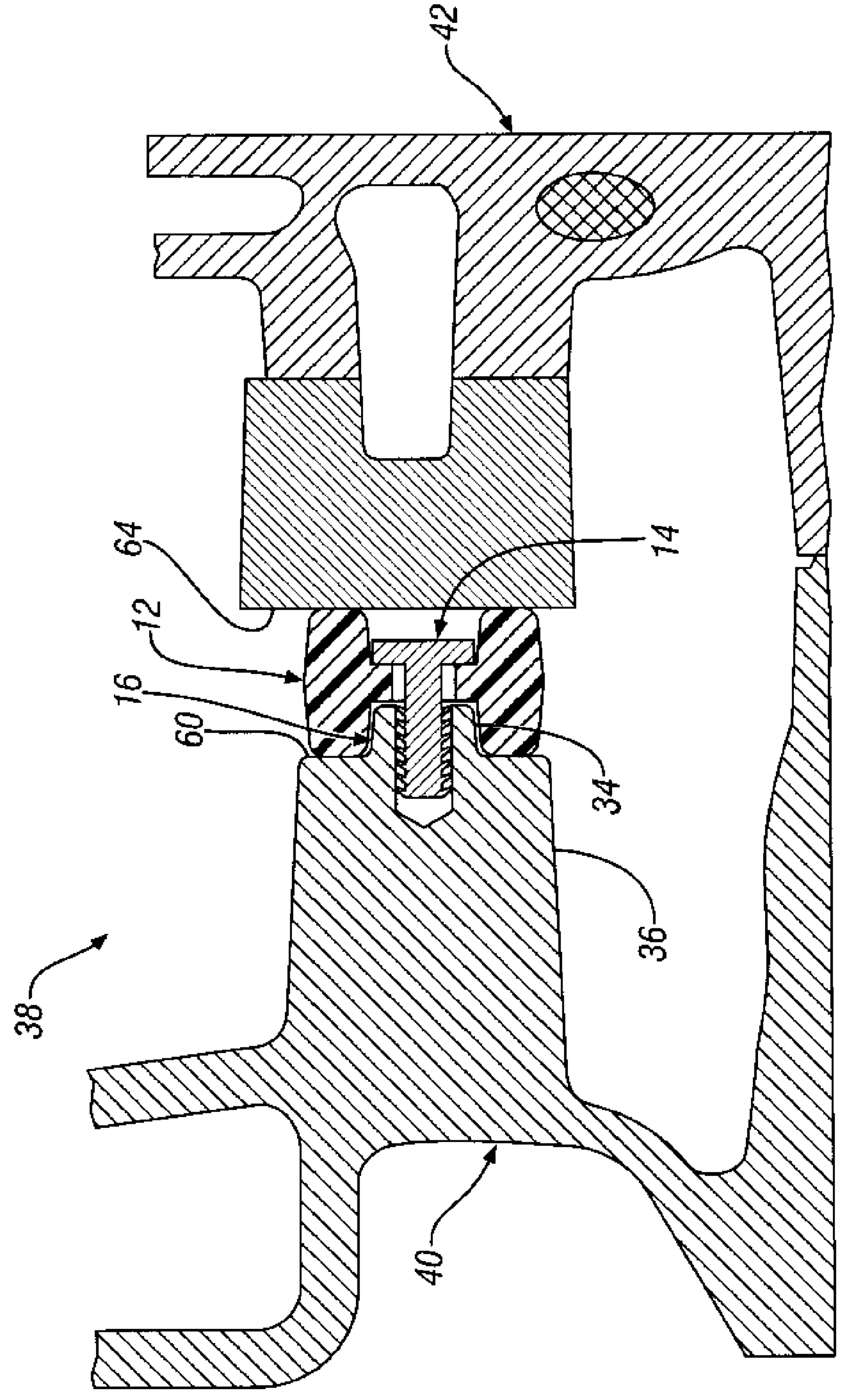
FIG. 4 is a cross-sectional view from the line 4-4 of FIG. 2 showing noise damping engagement of another acoustic bumper on the front cover with an associated chain tensioner body attached to the engine block.

FIG. 2 illustrates an engine 38 showing the front side of an engine cover 40 formed as a metal casting, such as aluminum, and mounted on an engine block 42 (see FIGS. 3 and 4). The cover 40 includes a peripheral portion 44 including numerous peripheral mounting bosses 46 for receiving mounting bolts, not shown, for attaching the cover 40 to the engine block 42. A large central portion 48 of the cover 40 is unsupported and thus is subject to receive and respond to noise vibrations from the various block mounted accessories as well as other mechanisms or components which may be mounted on the cover 40.

For example, the front cover 40 includes a mounting boss 50 for receiving a front mounted water pump, not shown, which connects with internal water passages 52 cast into the cover 40 for conducting water from the water pump boss 50 to engine block inlet passages, not shown, in the block front face. An air intake boss 54 supports an air intake throttle body, not shown, and connects with internal air passages 56 in the cover 40 for conducting intake air to manifold passages, not shown, in the engine block 42.

The front of the block, not shown, generally mounts multiple mechanisms required for engine operation. These may include a camshaft drive mechanism including primary and secondary drive chains with associated chain tensioners. An oil pump 58 may be mounted to the block surrounding the end of the crankshaft, not shown.

Details of these features are not illustrated, it being understood that they may occupy considerable space behind the front cover and thereby interfere with direct mounting of the unsupported central portion 48 of the cover 40 to the block in order to reduce transmission of noise vibrations from the unsupported central portion. Additionally, direct mounting of the central portion to the block may be undesirable as it may introduce alignment problems for bolt openings and create additional oil leakage paths that need to be sealed.

FIG. 3 is a cross-sectional view of the engine 38 from the line 3-3 of FIG. 2 in the direction of the arrows. FIG. 3 shows the cast cover 40 including a water passage 52 and a pillar 36 extending inward from the outer face of the cover to an inner end 60 on which is mounted a boss 16, forming part of an acoustic bumper assembly 10 as previously described. Assembly 10 includes a raised annular portion 34 on which an acoustic bumper 12 is received. A retainer 14, holding the bumper 12 in position, has the head 28 engaging the web 22 of the bumper and a shank 30 extending through the retainer hole 24 into the blind hole 33 of the pillar 36 and retained therein by the deformable ridges 32 gripping the sides of the blind hole 33.

Upon installation of the cover 40 as shown on the front of the engine block 42, the acoustic bumper 12 is urged into compressive engagement with an opposing surface 62 of the block 42, so that the bumper 12 applies a damping force on the cover to reduce noise vibrations of the cover 40 adjacent to the bumper 12. Note that, after installation of the cover, the acoustic bumper 12 is retained in place radially by the raised annular portion 34 of the pillar 36 extending into the associated recess 20 of the bumper 12 so that the retainer 14 is no longer needed after the cover is installed.

FIG. 4 is a cross-sectional view of the engine 38 from the line 4-4 of FIG. 2 in the direction of the arrows. FIG. 4 is similar to FIG. 3 in that an acoustic bumper 12 is mounted on a pillar 36 of the cover 40 in exactly the same way as described for the location shown in FIG. 3, so that like reference numerals are used for like parts. However, at this location, the bumper 12 engages a body of a camshaft chain tensioner 64 mounted to the front end of the engine block 42. The length of the cover pillar 36 is adjusted to accommodate the raised surface of the tensioner body 64 so that the compressive force of the bumper 12 on the cover is controlled accordingly. Preferably, all of the acoustic bumpers 12 mounted on an engine cover are of the same design and size so that installation errors will be avoided.

Figure 5:
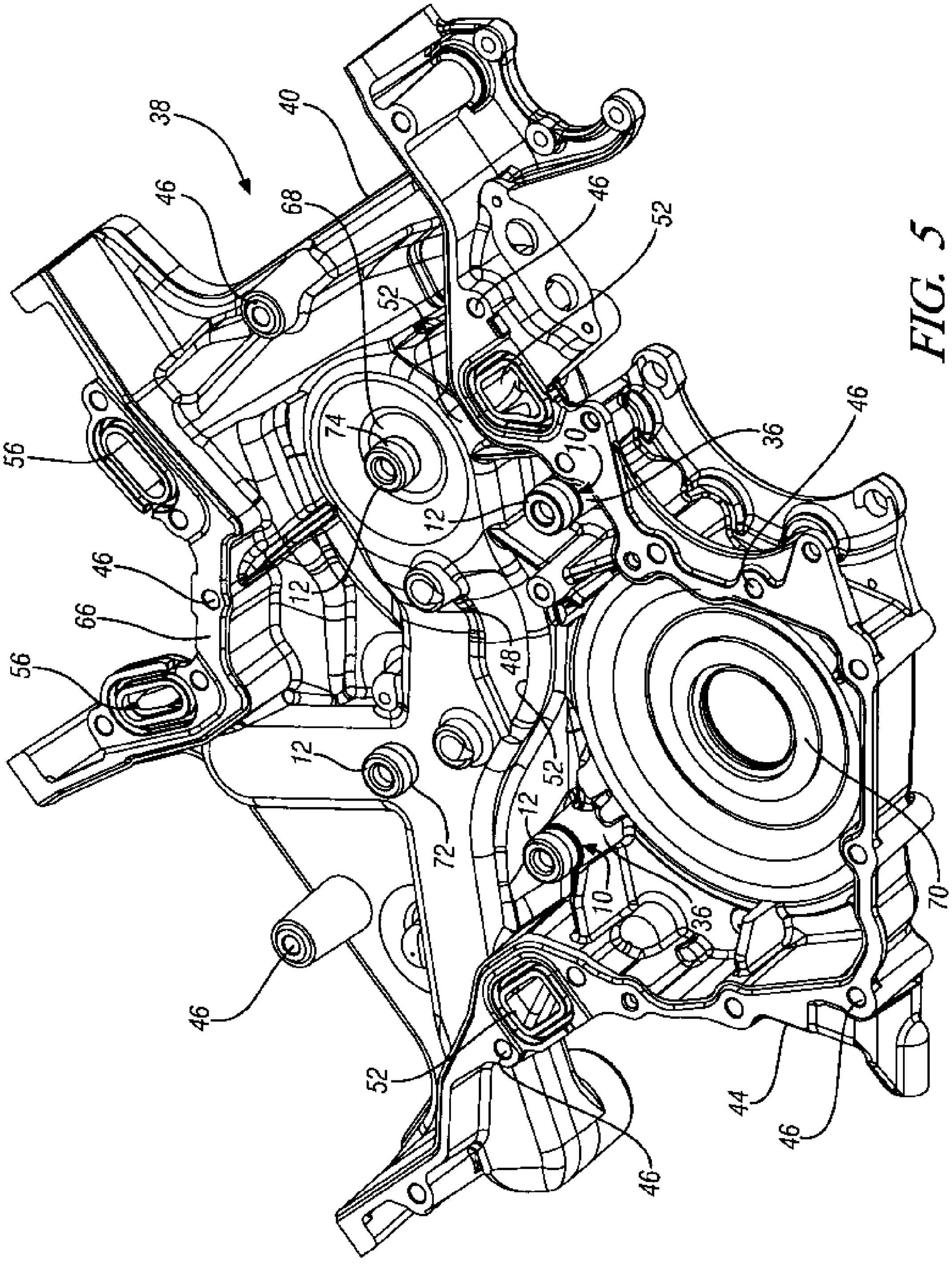
FIG. 5 is a rear view of the engine front cover showing noise damping acoustic bumpers at various exemplary locations on the inside of the front cover for noise damping engagement of the bumpers with the engine block or associated components for damping noise vibrations of the engine cover all in accordance with the invention.

Referring now to FIG. 5 of the drawings, the inside face 66 of the engine front cover 40 is shown. The peripheral mounting bosses 46 are shown as in FIG. 2 as is the large unsupported central portion 48 of the cover as viewed from the inside, including the outlets of water passages 52 and air passages 56 which connect with mating openings, not shown, in the engine block. The inside face 68 of the water pump recess is also shown, as are the cast-in water passages 52. A recess 70 into which the oil pump extends is also shown.

FIG. 5 also shows the positions of the pillars 36 of FIGS. 3 and 4 having the acoustic bumpers 12 mounted on them to form bumper assemblies 10. It will be recognized that the left hand bumper assembly 10 of FIG. 5 is located at Section 3-3 on the right side of the exterior of front cover 40 of FIG. 2. Similarly, the right hand bumper assembly 10 of FIG. 5 is located at Section 4-4 on the left side of the exterior of front cover 40 of FIG. 2.

In order to illustrate the versatility of the noise dampening features of the present invention, FIG. 5 also illustrates two exemplary additional locations suitable for the mounting of acoustic bumpers 12 on the inside of the engine front cover 40. One additional location 72 is positioned on a water passage wall of the cover and the other additional location 74 is positioned on the internal face 68 of the water pump cavity. It should be understood that additional or alternative locations for acoustic bumpers 12 to be located may be positioned at any place where there is access from the inside of the front cover 40 to the front of the engine block, except where a moving component, such as a timing chain, is blocking the way. As was previously mentioned, all the acoustic bumpers should be of identical size and design. This provides many more locations for mounting of acoustic bumpers 12 than would be possible if the bumpers had to be located through the outside of the cover or on the block face where other devices could be compromised.

It should be understood that the acoustic bumper of this invention is capable of use in many applications where a resilient bumper is required and is not limited by the disclosure herein of a specific application to an engine front cover. Neither should the application to a front engine cover limit applications to other covers including engine covers or to machines other than engines wherein a need for damping noise vibrations or other damping applications exists.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. An engine including an engine block having an end and including at least one noise producing component;

a cover mounted on the block and including peripheral portions secured to the block and an unsecured central portion subject to transmission of noise vibrations from the engine to external surroundings; and at least one resilient acoustic bumper mounted to the unsecured central portion of the cover and compressively engaging the engine block or an associated component, the bumper being operative to dampen noise vibrations in the central portion and reduce the transmission of noise from the cover.

2. An engine as in claim 1 wherein a plurality of resilient acoustic bumpers operative to dampen noise vibrations are mounted to the cover unsecured central portion and compressively engage the engine block or associated component.

3. An engine as in claim 2 wherein the associated components include at least one of a camshaft drive mechanism, an oil pump and a water pump with passages carried by the cover.

4. An engine as in claim 3 wherein the cover is a metal casting containing the water passages.

5. An engine as in claim 2 wherein the acoustic bumpers are doughnut shaped annular rings having identical coaxial recesses on opposite sides with a central web including an axially located retainer hole.

6. An engine as in claim 5 wherein each acoustic bumper is located radially on the cover interior by a raised boss of the cover received in an associated locating recess of the respective bumper.

7. An engine as in claim 6 wherein each bumper is retained to the cover prior to installation of the cover on the engine by a fastener inserted through the retainer hole of the bumper into a blind hole of the raised boss.

8. An engine as in claim 7 wherein the fastener is a headed manual push pin having withdrawal deterring means.

9. An engine cover for attachment to an engine block, the cover including peripheral portions to be secured to the block and an unsupported central portion subject to transmission of noise vibrations to external surroundings; and at least one resilient acoustic bumper mounted to the central portion and adapted to compressively engage the engine block or an associated component, the bumper being operative to dampen noise vibrations in the central portion and reduce the transmission of noise from the cover when installed.

10. An engine cover as in claim 9 wherein a plurality of resilient acoustic bumpers operative to dampen noise vibrations are mounted to the cover unsecured central portion and are adapted to compressively engage the engine block or an associated component.

11. An engine cover as in claim 10 wherein the acoustic bumpers are doughnut shaped annular rings having identical coaxial locating recesses on opposite sides with a central web including an axially located retainer hole.

12. An engine cover as in claim 11 wherein each acoustic bumper is located radially on the cover interior by a raised boss of the cover received in an associated locating recess of the respective bumper.

13. An engine cover as in claim 12 wherein each bumper is retained to the cover prior to installation of the cover on the engine by a fastener inserted through the retainer hole of the bumper into a blind hole of the raised boss.

14. An engine cover as in claim 13 wherein the fastener is a headed manual push pin having withdrawal deterring means.

15. A resilient acoustic bumper comprising:

a doughnut shaped annular ring having identical coaxial locating recesses on opposite sides with a central web including an axially located retainer hole;

wherein the bumper is adapted to be located radially on a component by a raised boss of the component received in one of the locating recesses of the bumper; and a fastener inserted through the retainer hole of the bumper and adapted to be retained in a hole of the raised boss to fix the bumper to the component.

16. A resilient acoustic bumper as in claim 15 wherein the fastener is a headed manual push pin having withdrawal deterring means.

* * * * *